US008621682B2

(12) United States Patent
Maximilien et al.

(10) Patent No.: US 8,621,682 B2
(45) Date of Patent: Jan. 7, 2014

(54) SYSTEM FOR DISPENSING AND RECOVERING LIQUIDS AND DEVICE COMPRISING SAME

(76) Inventors: Richard Maximilien, Romorantin Lanthenay (FR); Marc Legrand, Romorantin Lanthenay (FR)

( * ) Notice: Subject to any disclaimer, the term of this patent is extended or adjusted under 35 U.S.C. 154(b) by 1149 days.

(21) Appl. No.: 12/282,079

(22) PCT Filed: Mar. 6, 2007

(86) PCT No.: PCT/FR2007/000394
§ 371 (c)(1),
(2), (4) Date: Dec. 1, 2008

(87) PCT Pub. No.: WO2007/101938
PCT Pub. Date: Sep. 13, 2007

(65) Prior Publication Data
US 2009/0090420 A1    Apr. 9, 2009

(30) Foreign Application Priority Data
Mar. 7, 2006 (FR) ..................... 06 50788

(51) Int. Cl.
*A47K 1/00* (2006.01)
(52) U.S. Cl.
USPC .................. 4/625; 4/626; 4/602; 220/530
(58) Field of Classification Search
USPC ............... 4/602, 625, 626; 220/530
See application file for complete search history.

(56) References Cited

U.S. PATENT DOCUMENTS

| 3,931,907 | A | * | 1/1976 | Henle | 220/530 |
| 5,199,594 | A | * | 4/1993 | Obara et al. | 229/117.3 |
| 5,465,438 | A | * | 11/1995 | Allman et al. | 4/626 |
| 6,253,394 | B1 | * | 7/2001 | Goyette et al. | 4/626 |
| 2003/0019031 | A1 | * | 1/2003 | Mosis | 4/625 |

FOREIGN PATENT DOCUMENTS

DE    8716514 U1    4/1988
FR    2807745 A1    10/2001

* cited by examiner

*Primary Examiner* — Gregory Huson
*Assistant Examiner* — Lauren Heitzer
(74) *Attorney, Agent, or Firm* — Browdy and Neimark, PLLC

(57) ABSTRACT

The invention concerns a system for dispensing and recovering liquids designed to be arranged in a rigid container, comprising a liquid dispensing tank (16) and a tank (17) for recovering liquid after use, each tank (16, 17) including an envelope (18). Each envelope (18) includes two similar walls (19, 20) comprising each an outer surface and a peripheral edge (23). Each envelope (18) has a retracted configuration wherein said walls (19, 20) are deployed one proximate the other and in an inflated configuration wherein said outer surfaces of each said wall (19, 20) are convex. At least one envelope (18) is capable, in its inflated configuration, to be nested in the other envelope (18) in its retracted configuration.

19 Claims, 4 Drawing Sheets

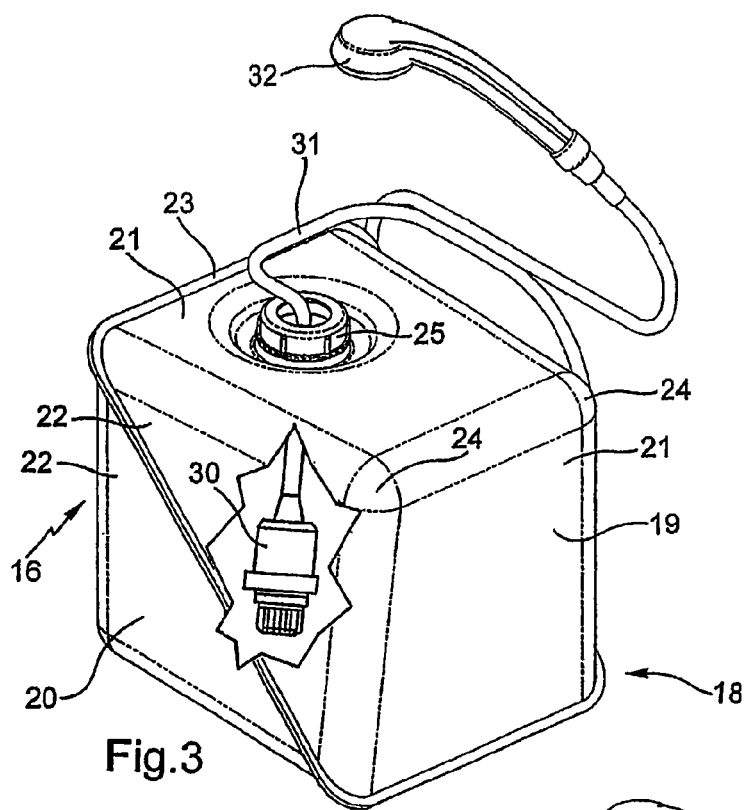
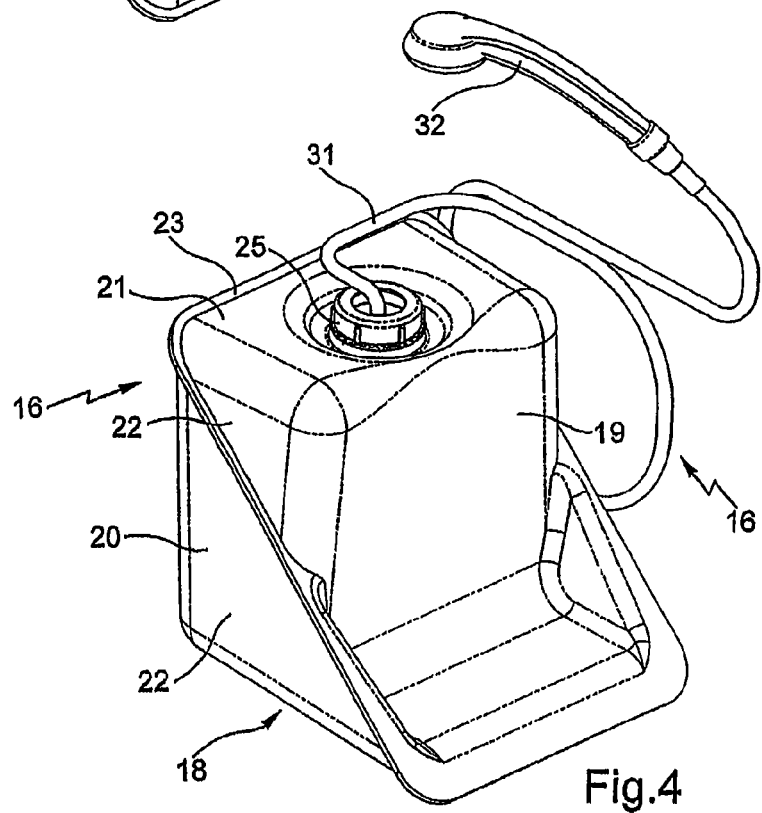

SYSTEM FOR DISPENSING AND RECOVERING LIQUIDS AND DEVICE COMPRISING SAME

The invention is generally concerned with systems for dispensing and recovering liquids in a rigid container.

The document FR 2 807 745 discloses a hydraulic device including a system of this kind disposed in a container. The system includes an upper tank for receiving waste water and a lower tank in which clean water is stored. The two tanks are expandable and compressible and are separated by a disk that compresses the lower tank against the walls of the container by means of a spring disposed at the perimeter of the upper tank, in particular to distribute water under pressure. When empty, the upper tank has a usable volume able to receive waste water before the lower tank begins to be emptied. As the lower tank is emptied, the volume it occupies decreases while the usable volume of the upper tank increases.

The invention aims to provide a system of the same kind for dispensing and recovering liquids but having a simplified structure and an enhanced volume for storing liquid as well as being particularly practical and convenient to manufacture and to use.

To this end, the invention proposes a system for dispensing and recovering liquids adapted to be disposed in a rigid container, including a tank for dispensing liquid to be used and a tank for recovering liquid after use, each of said tanks including an envelope and an orifice through which liquid passes, characterized in that each of said envelopes includes a first wall and a second wall which are similar and each of which includes an external surface and a peripheral rim, said walls of one of said envelopes being connected to each other by said peripheral rim, each of said envelopes being adapted to have a contracted configuration in which said walls are close to each other and said external surface of said second wall is convex while said external surface of said first wall is concave, and an expanded configuration in which contact between said two walls is limited to said peripheral rims and said external surfaces of each of said walls are convex, at least one of said envelopes being adapted, in its expanded configuration, to be nested in the other of said envelopes in its contracted configuration, said two first walls being in contact with each other.

As the dispensing tank is emptied and the recovery tank is filled, the convex shape of the external surface of each first wall is reversed. The evolution of the configuration of the envelopes corresponds to this reversing of the convex shape that occurs entirely because of the effect of the increase in the volume of liquid. During this evolution, the first walls remain in mutual contact.

This evolution occurs without the total volume occupied by the system changing. The volume of a tank in the expanded configuration corresponds overall to the total volume because this kind of tank becomes nested inside the other tank which, in its contracted configuration, occupies a negligible volume compared to the total volume of the system.

According to implementation features that are particularly simple and convenient as much for manufacture as for use:
said envelopes have similar dimensions and each of said envelopes is adapted, in its expanded configuration, to be nested in the other of said envelopes in its contracted configuration, said two first walls being in contact with each other; and where appropriate
each of said first walls and each of said second walls includes two rectangular panels and two lateral panels adapted so that in their expanded configuration each of said envelopes is parallelepipedal; and where appropriate
each of said first walls is thinner in its corners formed at the junction of two of said rectangular panels and one of said transverse panels.

The variation in the thickness of the panels achieves a flexibility that facilitates the change of the convex shape of the first wall as well as enabling the tanks to offer a combined stiffness that contributes to making the system durable in use in the container and when emptying and filling it outside the container.

According to implementation features that are particularly simple and convenient as much for manufacture as for use:
each of said tanks includes a cap adapted to close a respective one of said orifices, said caps having different diameters; and where appropriate
the system includes a dispensing hose one end of which is situated in said dispensing tank and pumping means for the liquid to be used adapted to evacuate that liquid from said dispensing tank via said hose; and where appropriate
said pumping means include a pump disposed inside said dispensing tank and an electrical power supply cable of said pump adapted to be connected to electrical power supply means, said cap including at least one hole for said cable and said hose to pass through; or
said pumping means include a pump disposed outside said dispensing tank and an electrical power supply cable of said pump adapted to be connected to electrical power supply means, said hose being connected to said pump and said cap including a hole for said hose to pass through.

The invention further proposes a device for dispensing and recovering liquids characterized in that it comprises a rigid container and a system as disclosed hereinabove disposed in said container.

The evolution of the configuration of the tanks is the result of the interaction of the tanks themselves through the mutual contact of the first walls. Thus the system is simply disposed in the container or removed from the container, connecting or disconnecting the dispensing and recovery means as necessary.

According to implementation features that are particularly simple and convenient as much for manufacture as for use:
said container is parallelepipedal; and/or
said container includes a sink and a plughole situated in the bottom of said sink, said recovery tank including a cap adapted to close said orifice of the recovery tank, said system further including recovery means including a hose a first end of which is connected to said plughole and a second end of which is connected to said cap of said recovery tank; and/or
the device includes a removable wall for access to said system.

The features and advantages of the invention will emerge from the following description, given by way of preferred but nonlimiting example, with reference to the appended drawings, in which:

FIG. 3 is a perspective view of the dispensing tank from FIG. 2, in its expanded configuration, partially cut away to show the pump located inside it;

FIG. 4 is a view similar to that of FIG. 3, but with no partial cutaway, the dispensing tank being in a partly filled state;

Figure 1:
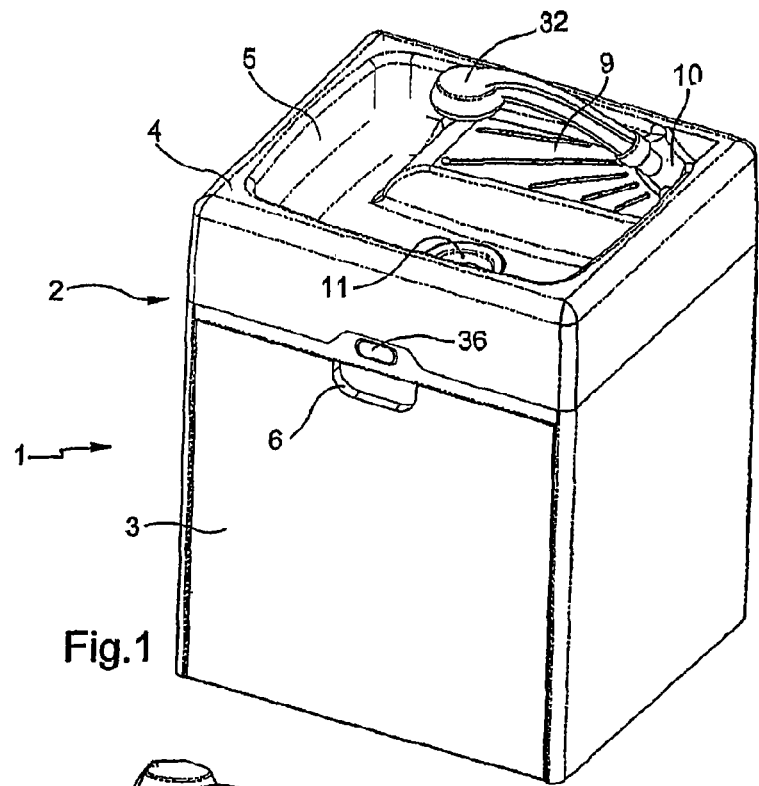
FIG. 1 is a perspective view of a device of the invention.

The device 1 includes a plastic material container 2 and has a generally parallelepipedal shape. It has four lateral walls, one of which includes a removable portion 3, and a top wall 4 with a depression that forms a sink 5.

The portion 3 is rectangular and, when it is mounted in the container 2, it extends the entire width of the lateral wall of which it is part. In the heightwise direction, it extends from the bottom of the container 2, i.e. from the side opposite the wall 4, to an edge spaced from the wall 4.

The portion 3 has a cut-out 6 on its edge facing the wall 4. This cut-out 6 forms a handle useful for grasping the portion 3 to separate it from the rest of the container 2 or to replace it thereon.

The portion 3 also includes clipping means (not shown) cooperating with corresponding clipping means on the rest of the container 2 so that the portion 3 is removable.

In variants of this embodiment that are not shown, the portion 3 includes fixing means with magnets or hinges for removably fixing it to the rest of the container.

The sink 5 is L-shaped, extending along two edges of the wall 4. The sink 5 delimits a rectangular portion 9 of the wall 4 that is globally in the same plane as the common edges of that wall 4 and the lateral walls.

The wall 4 includes two orifices 10, 11.

The orifice 10 is situated in a corner of the wall 4 that is also a corner of the rectangular portion 9. This orifice 10 is adapted to allow one of the liquid dispensing means to move from inside the container 2 to outside it.

The orifice 11 is situated in the bottom of the sink 5. It is a circular orifice serving as a plughole.

The wall 4 is molded in one piece with the edge portion of the four lateral walls, this edge portion extending from the wall 4 toward the bottom of the container 2 as far as the portion 3. The height of this edge portion corresponds to the depth of the sink 5. The portion including the wall 4 and the portion including the three lateral walls are fixed together by appropriate mechanical connection means.

Inside the container 2 is the system 15 for dispensing and recovering liquids. It includes a liquid dispensing tank 16 and a liquid recovery tank 17.

The tank 16 is described next.

The tank 16 includes an envelope 18 in a drinking water grade plastic material.

This envelope 18 has two walls 19 and 20. The wall 19 includes two rectangular panels 21 and two triangular lateral panels 22. In the expanded configuration shown in FIG. 3, the panels 21 are disposed transversely to each other and each panel 22 extends transversely to each panel 21.

The wall 19 has the overall shape of a cube cut in two on a plane passing through two opposite edges and through the center of the cube.

The wall 19 has no sharp edge between the two panels 21 or between a panel 22 and a panel 21, the areas in which these panels are joined together being rounded. In these joining areas, and primarily in the corners 24 formed at the junction of two panels 21 and a panel 22, the panels are thinner than in the rest of the panel, with the result that the wall 19 is more flexible in these areas.

The wall 19 has a rim 23 along the free edge that extends with a closed contour along the four panels 21, 22. The rim 23 extends along a rectangular contour with rounded corners.

A circular orifice passes through one panel 21 of the wall 19. The plane containing the contour of this orifice is slightly offset relative to the principal plane of the panel 21, the area in which the contour of the orifice is joined to the rest of the panel 21 being globally frustoconical.

The wall 20 is similar to the wall 19 and includes panels 21, 22 and a rim 23. On the other hand, the wall 20 does not include a circular orifice.

Figure 6:
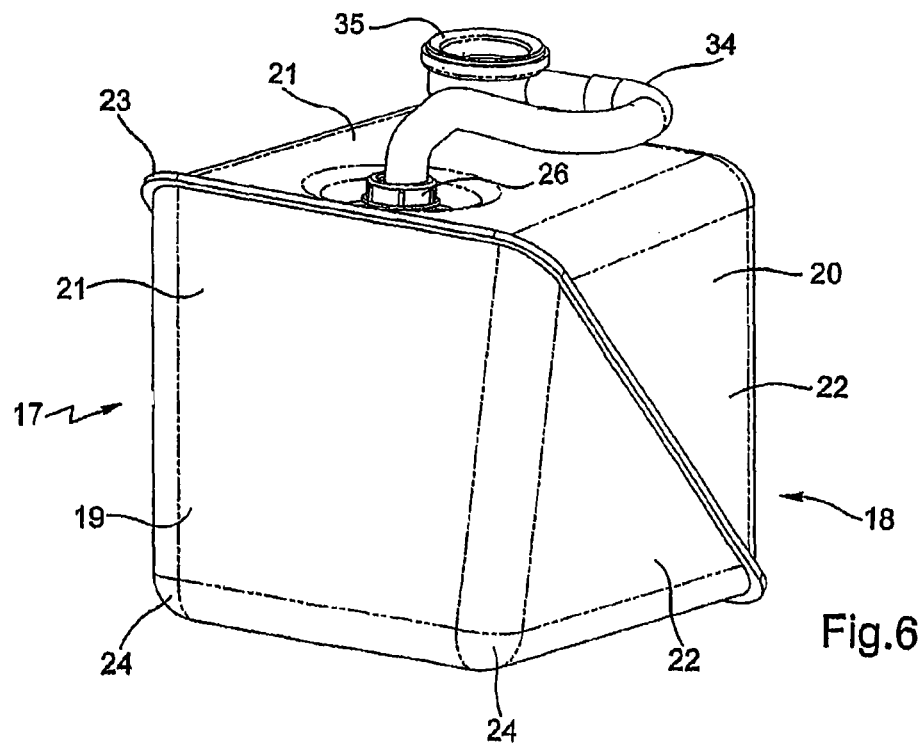
FIG. 6 is a perspective view of the recovery tank in its expanded configuration.

The two walls 19, 20 are joined together at their rim 23. The foregoing description of the envelope 18 of the tank 16 is also valid for the envelope 18 of the recovery tank 17 (FIG. 6), which includes two walls 19 and 20, each wall 19, 20 including two panels 21, two panels 22 and a peripheral rim 23 by which the two walls 19, 20 are joined together. On the other hand, it is the wall 20 of the envelope of the recovery tank 17 that includes a panel 21 with an orifice through it.

The tank 16 further includes a plastic material cap 25 that can be screwed to a threaded neck connected to the orifice. The cap 25 further includes a hole for a hose to pass through.

The tank 17 also includes a plastic material screw-on cap 26 which cooperates with a threaded neck connected to the orifice. The cap 26 also has a hole in it for connecting a hose.

The cap 26 has a diameter smaller than that of the cap 25.

The system 15 further includes dispensing means: a pump 30 and a dispensing hose 31.

The pump 30 is disposed inside the tank 16 and connected to a first end of the hose 31 (FIG. 3). Here the pump 30 pumps 10 liters per minute, draws an electrical current of 3 A, and has an electrical power rating of 36 W.

The hose 31 passes through the hole in the cap 25 provided for this purpose. Sealing means are provided on the cap 25. Part of the hose 31 is outside the tank 16 and its second end is connected to a spray head 32.

The spray head 32 is adapted to pass through the orifice 10 in the wall 4 so that when the tank 16 is situated in the container 2 the spray head 32 is outside the container 2 above the sink 5.

The pump 30 is connected by a cable, not shown, to electrical power supply means. The cable also exits the tank 16 via the cap 25.

The tank 17 includes liquid recovery means in the form of a recovery hose 34, one end of which is connected to the cap 26 which is itself connected to the neck of the orifice. At its other end, the hose 34 includes a ring 35 that is adapted to cooperate with the plughole 5.

The envelope 18 of each tank 16, 17 has an expanded configuration and a contracted configuration and more generally a tank 16, 17 is in its expanded or contracted configuration when its envelope 18 is in the expanded or contracted configuration, respectively.

When the tanks 16, 17 are in their expanded configuration (FIGS. 3, 6), the walls 19 and 20 are away from each other, with the result that the tank has a parallelepipedal shape. This shape corresponds to a full state of the tank.

Figure 5:
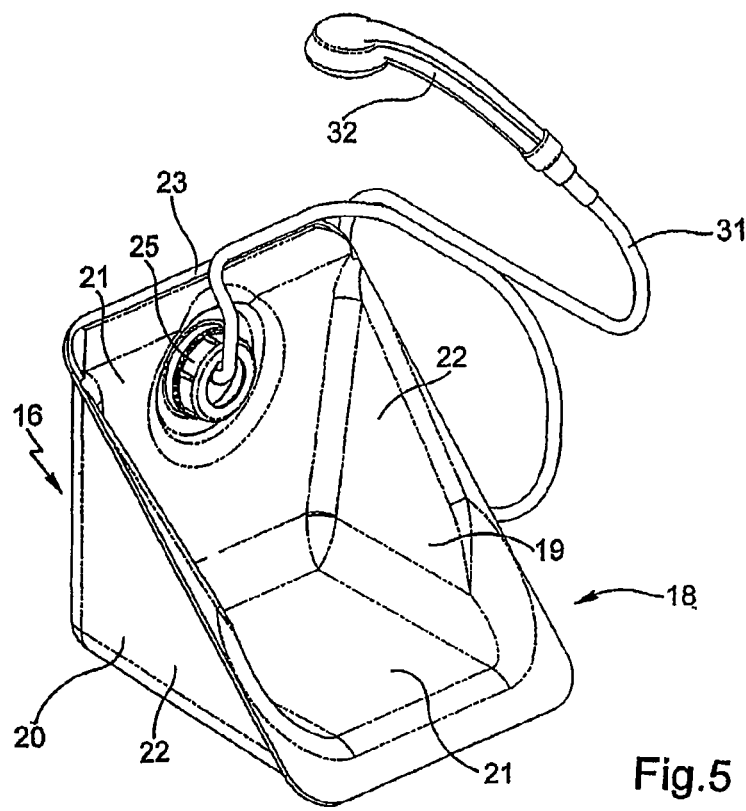
FIG. 5 is a view similar to that of FIG. 3, the tank being in its contracted configuration.
Figure 7:
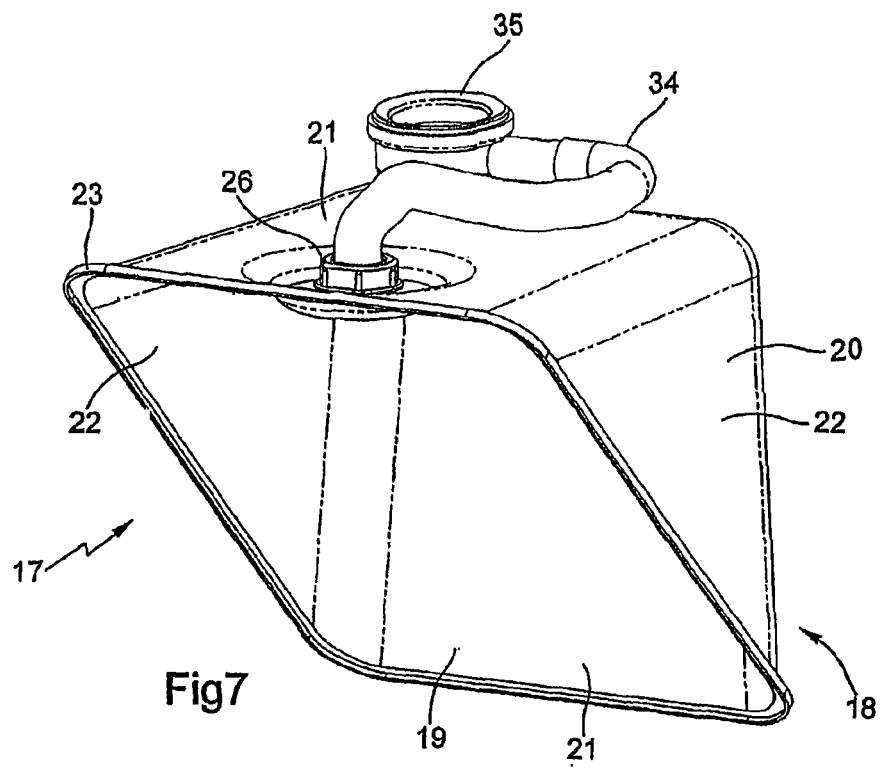
FIG. 7 is a view similar to that of FIG. 6, the tank being in its contracted configuration.

In their contracted configuration (FIGS. 5, 7), the tanks 16 and 17 have a negligible volume. The wall 19 lies against the wall 20, in other words the panel 21 of the wall 19 and the panel 21 of the wall 20 separated by the peripheral rim 23 lie one against the other. Similarly, the panel 22 of the wall 19 and the panel 22 of the wall 20 lie one against the other, with the result that the wall 19 is folded into the wall 20.

In this configuration, each of the tanks 16, 17 has a wall 20 having a convex external surface and a wall 19 having a concave external surface, the shape of the wall 19 espousing the shape of the wall 20.

Because of their similar shape, when the tank 16 is in the expanded configuration and the tank 17 in the contracted configuration, the tank 17 can be nested in the tank 16, in other words the tank 17 covers the external surface of the wall 19 of the tank 16.

When the tank 16 is in its contracted configuration and the tank 17 is in its expanded configuration, the tank 17 is nested in the tank 16, in other words the tank 16 covers the wall 19 of the tank 17, the external surface of the wall 19 of the tank 16 being in contact with the external surface of the wall 19 of the tank 17.

Just like the tank 17, the tank 16 can assume all intermediate configurations between the expanded configuration and the contracted configuration. In one possible intermediate configuration (see FIG. 4), a panel 21 of the wall 19 is partly in contact with the adjacent panel 21 of the wall 20, as are the panels 22 of the wall 19 with the adjacent panels 22 of the wall 20.

Each of the tanks 16, 17 has a volume of about twenty liters. Here the container 2 has a volume of about fifty liters.

The use of the system 16 and more generally of the device 1 is described next.

Figure 2:
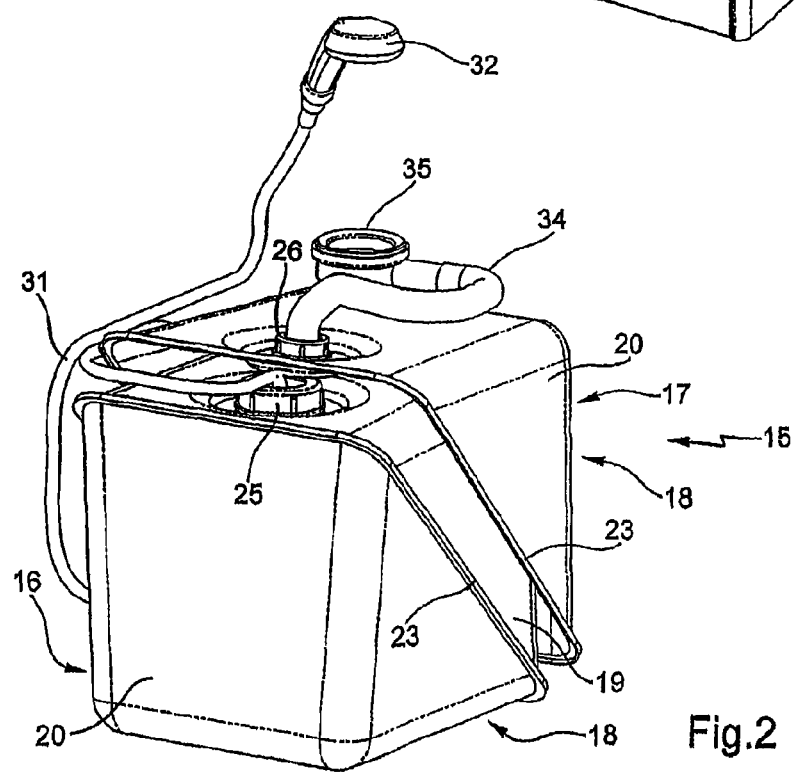
FIG. 2 is a perspective view of a system of the invention with the dispensing hose connected to the dispensing tank in its expanded configuration and the recovery hose connected to the recovery tank in the contracted configuration.

The device 1, which can in particular be used in recreational vehicles, is provided with the system 15 placed in the container 2 with the tank 16 full and the tank 17 empty (FIG. 2). Here the tank 16 is a clean water tank and the tank 17 is a waste water tank.

To cause water to flow through the spray head 32, a switch 36 located above the cut-out 6 is operated. The switch 36 is connected by means, not shown, to the pump 30. Operating the switch 36 starts the pump 30 with the result that clean water rises up the hose 31 until it flows through the spray head 32.

If the water flows into the sink 5, it is evacuated via the plughole and then via the hose 34 until it arrives in the tank 17.

As waste water arrives in the tank 17, the tank goes from its contracted configuration to an intermediate configuration, in other words the tank 17 is progressively expanded by the incoming waste water. At the same time, the tank 16 which was originally in its expanded configuration is emptied of liquid.

With the tank 16 emptying and the tank 17 filling, the wall 19 of the tank 16 begins to collapse toward the wall 20 and the wall 19 of the tank 17 begins to move away from the wall 20 of the tank 17.

On the other hand, the wall 20 of the tank 16 and the wall 20 of the tank 17 are not deformed and remain in place. As the tank 17 is filled, the tank 16 contracts until its envelope 18 is in its contracted configuration and the envelope of the tank 17 is expanded to its expanded configuration by the accumulated waste water.

The originally convex external surface of the wall 20 of the tank 16 is then concave and the originally concave external surface of the wall 20 of the tank 17 is then convex.

Here the volume of waste water stored in the tank 17 corresponds to the volume of clean water originally stored in the tank 16.

When the tank 17 is full and the tank 16 is empty, the tank 16 is nested in the tank 17.

When the tank 16 is empty, it is no longer possible to obtain water. Users are therefore informed that they must refill the clean water tank 16 and empty the waste water tank 17.

To do this, the wall 3 is detached from the container 2. The caps 25, 26 are unscrewed and the pump 30 is removed from the tank 16. The system 15 can then be removed from the container 2 to empty the tank 17 and to fill the tank 16 with clean water, the hoses 31, 34 remaining with the device 1.

To facilitate transporting the tanks 16, 17, handles (not shown) can be provided on the walls of the tanks 16, 17, such handles being molded in one piece with the wall of which they form part.

If the clean water is drinking water, then water can be drawn off to drink it and, more generally, water can be extracted from the tank 16 without all of it ending up as waste water in the tank 17. In this case, the volume of water recovered in the tank 17 is less than the maximum volume of water that this tank can hold. Even if waste water does not occupy the whole of the usable volume of the tank 17 in the expanded configuration, the force exerted on the walls 19 by that quantity of waste water is sufficient to push them toward the wall 20 of the tank 16.

That force is incidentally very much lower than would be required to crush a tank with no wall adapted to turn inside out to come into contact with the other wall. In such a case, two spaced-apart principal walls would move together by crushing at least one lateral wall. The two principal walls could not come into contact with each other because of the height occupied by the crumpled lateral wall(s). A resulting empty volume much larger than that obtained in the contracted configuration would then be obtained.

The evolution of the configuration of the tanks 16, 17 is linked to how full the adjacent tank is.

When the tanks 16, 17 are replaced in the container 2, it is not possible to use the recovery tank 17 instead of the dispensing tank 16. Because the caps 25, 26 have different diameters, the dispensing hose 31 cannot be connected to the tank 17 and the hose 34 cannot be connected to the tank 16. Also, the pump 30 cannot be placed inside the tank 17 because the diameter of the orifice is too small.

Figure 8:
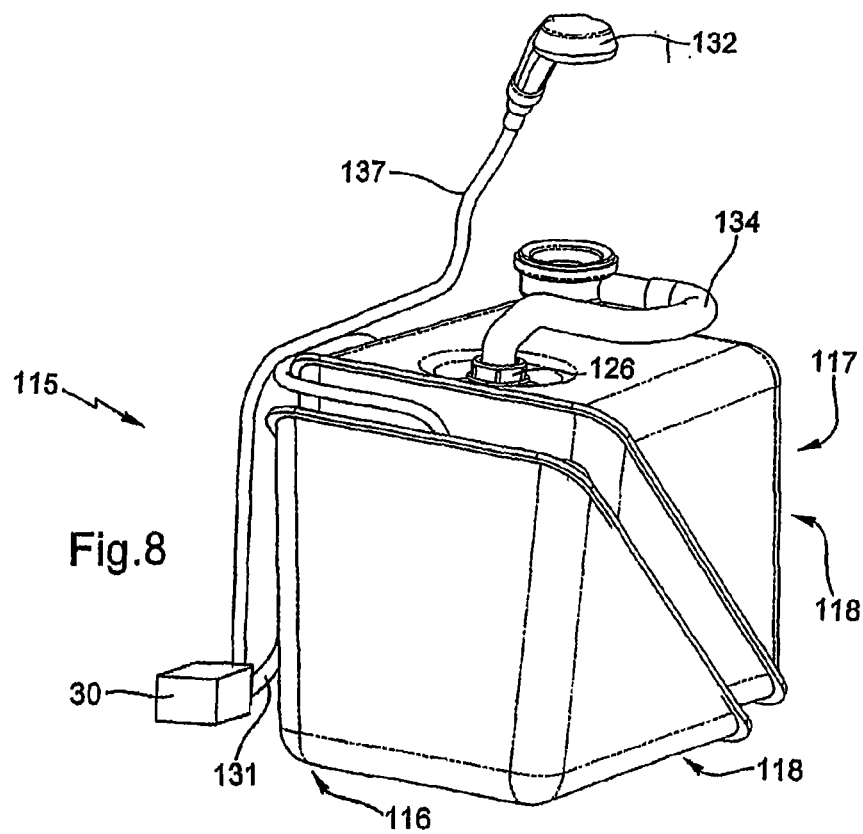
FIG. 8 is a view of a different embodiment of the system, similar to the FIG. 2 embodiment, the dispensing tank being in its contracted configuration and the recovery tank in its expanded configuration, the dispensing tank being shown with the pump disposed outside it.

A different embodiment shown in FIG. 8 is described next. The same references as before are used for similar elements in this embodiment, increased by 100.

The pump 130 is disposed outside the tank 116. A first hose 131 has one end inside the tank 116 and a second end connected to the pump 130, to pump the liquid out of the tank 116. A second hose 137 runs from the pump 130 to the spray head 132.

In another embodiment, the device 1 is of cylindrical shape and the walls 19, 20 are also of cylindrical shape in their expanded configuration, these walls 19, 20 being thinner along areas joining the panels that constitute them.

In a further embodiment, the caps have the same diameter and visual polarizing means are provided with caps and threads of a particular color for each respective cap.

In a further embodiment, the system 15 can include one or more additional tanks, for example a soap tank of small volume compared to the volume of the tanks 16 and 17. A dispensing hose is also provided for these additional tanks, with pumping means, for example mechanical pumping means.

In a further embodiment, not shown, the walls 20 are rigid and undeformable and the thickness of the panels 21, 22 of the walls 20 is constant.

In a further embodiment, the container is onboard a wheeled cleaning machine with a tank of soapy water and a soiled water recovery tank with the soapy water tank connected to a hose extended by a handle and a cleaning head. The handle includes aspiration means for recovering waste water rising up a hose in said handle, the hose being connected to the waste water tank.

The device has been described as a module on board a recreational vehicle for terrestrial applications. Other embodiments of the device are installed on board an air or sea transportation vehicle.

The invention claimed is:

1. A system for dispensing and recovering liquids configured to be disposed in a rigid container, including a tank for dispensing liquid to be used and a tank for recovering liquid after use, each of said tanks including an envelope and an orifice through which liquid passes, wherein each of said envelopes includes a first wall and a second wall which are similar, the first wall of one of the two envelopes being separate and distinct from the first wall of the other of the two envelopes, and each of which includes an external surface and a peripheral rim, said walls of one of said envelopes being connected to each other by said peripheral rim, each of said envelopes being configured to have a contracted configuration in which said walls are close to each other and said external surface of said second wall is convex while said external surface of said first wall is concave, and an expanded configuration in which contact between said two walls is limited to said peripheral rims and said external surfaces of each of said walls are convex, at least one of said envelopes being configured, in its expanded configuration, to be nested in the other of said envelopes in its contracted configuration, said two first walls being in contact with each other, wherein the first wall and the second wall of the two envelopes are exclusively connected to each other exclusively by the peripheral rim.

2. The system according to claim 1, wherein said envelopes have similar dimensions and each of said envelopes is configured, in its expanded configuration, to be nested in the other of said envelopes in its contracted configuration, said two first walls being in contact with each other.

3. The system according to claim 2, wherein each of said first walls and each of said second walls includes two rectangular panels and two lateral panels configured so that in their expanded configuration each of said envelopes is parallelepipedal.

4. The system according to claim 3, wherein each of said first walls is thinner in its corners formed at the junction of two of said rectangular panels and one of said transverse panels than in the rest of the first walls.

5. The system according to claim 1, wherein each of said tanks includes a cap configured to close a respective one of said orifices, the respective caps having different diameters.

6. The system according to claim 5, further comprising a dispensing hose one end of which is situated in said dispensing tank and pumping means for the liquid to be used configured to evacuate that liquid from said dispensing tank via said hose.

7. The system according to claim 6, wherein said pumping means include a pump disposed inside said dispensing tank, said cap including at least one hole for said cable and said hose to pass through.

8. The system according to claim 6, wherein said pumping means include a pump disposed outside said dispensing tank, said hose being connected to said pump.

9. A device for dispensing and recovering liquids, comprising a rigid container and a system according to claim 1 disposed in said container.

10. The device according to claim 9, wherein said container is parallelepipedal.

11. The device according to claim 9, wherein said container includes a sink and a plughole situated in the bottom of said sink, said recovery tank including a cap configured to close said orifice of the recovery tank, said system further including recovery means including a hose, wherein a first end of said hose is connected to said plughole and a second end of said hose is connected to said cap of said recovery tank.

12. The device according to claim 9, further comprising a removable wall for access to said system.

13. A device for dispensing and recovering liquids, comprising a rigid container and a system according to claim 2 disposed in said container.

14. A device for dispensing and recovering liquids, comprising a rigid container and a system according to claim 3 disposed in said container.

15. A device for dispensing and recovering liquids, comprising a rigid container and a system according to claim 4 disposed in said container.

16. A device for dispensing and recovering liquids, comprising a rigid container and a system according to claim 5 disposed in said container.

17. A device for dispensing and recovering liquids, comprising a rigid container and a system according to claim 6 disposed in said container.

18. A device for dispensing and recovering liquids, comprising a rigid container and a system according to claim 7 disposed in said container.

19. A device for dispensing and recovering liquids, comprising a rigid container and a system according to claim 8 disposed in said container.

* * * * *